(12) United States Patent
Theilmann et al.

(10) Patent No.: US 8,415,837 B2
(45) Date of Patent: Apr. 9, 2013

(54) SWITCH MODE VOLTAGE RECTIFIER, RF ENERGY CONVERSION AND WIRELESS POWER SUPPLIES

(75) Inventors: Paul Theilmann, San Diego, CA (US); Peter Asbeck, Del Mar, CA (US)

(73) Assignee: The Regents of the University of California, Oakland, CA (US)

( * ) Notice: Subject to any disclaimer, the term of this patent is extended or adjusted under 35 U.S.C. 154(b) by 324 days.

(21) Appl. No.: 12/949,343

(22) Filed: Nov. 18, 2010

(65) Prior Publication Data

US 2011/0124310 A1 May 26, 2011

Related U.S. Application Data

(60) Provisional application No. 61/262,282, filed on Nov. 18, 2009.

(51) Int. Cl.
*H05K 7/14* (2006.01)

(52) U.S. Cl. .................. 307/149; 340/645

(58) Field of Classification Search .............. 600/373, 600/377, 12, 13; 607/116, 156; 340/343.1, 340/645; 307/149
See application file for complete search history.

(56) References Cited

U.S. PATENT DOCUMENTS 6,366,206 B1 * 4/2002 Ishikawa et al. ............ 340/573.1
6,464,687 B1 * 10/2002 Ishikawa et al. ............ 604/891.1

OTHER PUBLICATIONS

Agilent, 2-Port and 4-Port PNA-X Network Analyzer, Data Sheet and Technical Specifications www.agilent.com/find/pnax, Agilent Technologies, Jun. 8, 2010.
Chakrabartty, Shantanu, et. al., "Sub-Microwatt Analog VLSI Trainable Pattern Classifier", *IEEE Journal of Solid-State Circuits*, vol. 42, No. 5, May 2007.
Chen, C.-L., et. al., "Efficiency-enhanced CMOS rectifier for wireless telemetry", *Electronics Letters*, vol. 43, No. 18, Aug. 31, 2007.
Curty, Jan-Pascal, et. al., A Model for µ-Power Rectifier Analysis and Design, *IEEE Transactions on Circuits and Systems—I: Regular Papers*, vol. 52, No. 12, Dec. 2005.
Ghovanloo, Maysam, etl.al., "Fully Integrated Wideband High-Current Rectifiers for Inductively Powered Devices", *IEEE Journal of Solid-State Circuits*, vol. 39, No. 11, Nov. 2004.
Gong, Cihun-Siyong Alex, et. al., "Efficient CMOS Rectifier for Inductively Power-Harvested Implants", *IEEE International Conference on Electron Devices and Solid-State Circuits*, Dec. 8-10, 2008.
Guo, Song, et. al., "An Efficiency-Enhanced CMOS Rectifier With Unbalanced-Biased Comparators for Transcutaneous-Powered High-Current Implants", *IEEE Journal of Solid-State Circuits*, vol. 44, No. 6, Jun. 2009.
Holleman, Jeremy, et. al., "A Sub-Microwatt Low-Noise Amplifier for Neural Recording", Engineering in Medicine and Biology Society, 2007, EMBS 2007, 29th Annual International Conference of the IEEE, Aug. 22-26, 2007.

(Continued)

*Primary Examiner* — Shawn Riley
(74) *Attorney, Agent, or Firm* — Greer, Burns & Crain Ltd.

(57) ABSTRACT

Embodiments of the present invention provide cross-coupled rectifiers that use near zero-threshold transistors in a switching topology, but provide a topology that avoids reverse conduction problems. Importantly, preferred embodiment rectifiers of the invention only provide a slightly increased on-resistance in each branch, while providing both very high operating efficiency and very low turn-on voltage. An embodiment of the invention is a voltage rectifier for the conversion of RF energy into DC voltage with a turn-on threshold voltages approaching 0V.

16 Claims, 9 Drawing Sheets

OTHER PUBLICATIONS

Karthus, Udo, et. al. "Fully Integrated Passive UHF RFID Transponder IC With 16.7-μW Minimum RF Input Power", *IEEE Journal of Solid-State Circuits*, vol. 38, No. 10, Oct. 2003.

Kotani, Koji, et. al., "High Efficiency CMOS Rectifier Circuit with Self-Vth-Cancellation and Power Regulation Functions for UHF RFIDS", *IEEE Asian Solid-State Circuits Conference*, Nov. 12-14, 2007.

Kotani, Koji, et. al., "High Efficiency Differential-Drive CMOS Rectifier for UHF RFIDs", *IEEE Journal of Solid-State Circuits*, vol. 44, No. 11, Nov. 2009.

Lanjnef, Nizar, et. al., "A sub-microwatt piezo-floating-gate sensor for long-term fatigue monitoring in biochemical implants", *Proceedings of the 28th IEEE EMBS Annual International Conference*, Aug. 30-Sep. 3, 2006.

Mandal, Soumyajit, et. al., "Low Power CMOS Rectifier Design for RFID Applications", *IEEE Transactions on Circuits and Systems I: Regular Papers*, vol. 54, Issue 6, Jun. 11, 2007.

Otis, B., et. al., "Low Power IC Design for Energy Harvesting Wireless Biosensors", *Radio and Wireless Symposium,, RWS*, 09, Jan. 18-22, 2009.

Rue, B., et. al., "Low-Voltage Low-Power High-Temperature SOI CMOS Rectifiers", *2006 IEEE International SOI Conference Proceedings*, Oct. 2-5, 2006.

Theilmann, Paul T., "Near Zero Turn-on Voltage High-Efficiency UHF RFID Rectifier in Silicon-on-Sapphire CMOS", *IEEE Radio Frequency Integrated Circuits Symposium*, May 23-25, 2010.

Theilmann, Paul T., "An Analytical Model for Inductively Coupled Implantable Biomedical Devices With Ferrite Rods", *IEEE Transaction on Biomeidical Circuits and Systems*, vol. 3, No. 1, Feb. 2009.

Umeda, Toshiyuki, et. al., "A 95MHz Rectifier Circuit for Sensor Network Tags With 10-m Distance", *IEEE Journal of Solid-State Circuits*, vol. 41, No. 1, Jan. 2006.

Yi, Jun, et. al., "Analysis and Design Strategy of UHF Micro-Power CMOS Rectifiers for Micro-Sensor and RFID Applications", *IEEE Transactions on Circuits and Systems I: Regular Papers*, vol. 54, No. 1, Jan. 2007.

Zhu, Zheng, et. al., "Brief Comparison of Different Rectifier Structures for RFID Transponders", Auto-ID Lab, University of Adelaide, Adelaide, SA, Apr. 24, 2004.

\* cited by examiner

SWITCH MODE VOLTAGE RECTIFIER, RF ENERGY CONVERSION AND WIRELESS POWER SUPPLIES

CLAIM FOR PRIORITY AND REFERENCE TO RELATED APPLICATION

This application claims priority under 35 U.S.C §119 from prior provisional application No. 61/262,282 which was filed on Nov. 18, 2010.

FIELD

A field of the invention is voltage rectifiers. Another field of the invention is RF energy conversion. Example applications of the invention include wireless sensors, wireless power supplies and wireless energy harvesting. Preferred particular applications of the invention include UHF RFID tags and wirelessly powered biomedical implant devices.

BACKGROUND

As wireless biomedical implant devices advance to smaller sizes with higher processing power, the issue of power supply becomes a critical design hurdle. Designers for biomedical devices have turned their attention to sensors that are powered by RF energy that is implanted on or within the skin. The most popular power transfer technique is inductive coupling (near-field) because attenuation in tissue is reduced in comparison to RF (far-field) traveling waves and antenna efficiency is independent of wavelength. Unfortunately, as device (antenna) size decreases power collected by the device falls off in proportion to the mutual inductance squared or $R^4$ where R is the radius of the antenna coil. For this reason it is important that the low RF energy levels collected by the antenna are efficiently converted to DC power to operate the implant.

Similarly, efficient energy conversion is important to RFID tags. A highly efficient RFID tag can be powered at a further distance from a reader, for example. Alternatively, a highly efficient RFID tag can be more readily powered by a reader when the tag is embedded in an article or medium that attenuates or absorbs RF energy.

The voltage rectifier is a critical element that affects efficiency of power conversion from AC RF energy to DC energy required for a device such as a medical implant or an RFID tag. Conventional rectifies used in wirelessly powered devices such as UHF RFIDs, micro-sensors and biomedical implants are unfortunately extremely inefficient at low input levels. The inefficiency arises from the threshold voltage ($V_{th}$) of devices used within the rectifier, which are generally standard CMOS transistors. If the peak-to-peak RF input voltage swing is below the $V_{th}$ of the devices used, the rectifier will never turn on and no DC output will be produced. This region is known as the "dead zone" and generally leads to reduced read ranges for wireless devices. See, e.g., S. Mandal and R. Sarpeshkar, "Low-Power CMOS Rectifier Design for RFID Applications," IEEE Trans. Circuits Syst. I, Reg. Papers, vol. 54, no. 6. In the case of biomedical implants, by setting the minimum power required for rectifier function, the dead zone will limit the minimum achievable implant size. Low threshold ($V_{th}$ typically ~|0.4V|) Schottky diodes have been used to reduce the dead zone but the threshold of a Schottky diode still presents a significant dead zone due to a threshold that does not approach zero, as reported in U. Karthaus and M. Fisher, "Fully integrated passive UHF RFID transponder IC with 16.7-µW minimum RF input power," IEEE J. Solid-State Circuits, vol 38, no. 10 pp. 1602-1608, October 2003.

Other efforts have coupled with CMOS devices with Vth-cancellation techniques to improve low input performance. For example, T. Umeda, H. Yoshida, S. Sekine, Y. Fujita, T. Suzuki, and S. Otaka, "A 950-MHz rectifier circuit for sensor network tags with 10-m distance," IEEE J. Solid-State Circuits, vol. 41, no. 1, pp. 35-41, January 2006, threshold is cancelled through the use of a static DC voltage applied to the devices. This method has the disadvantage of requiring an alternate power source to supply this canceling voltage, making a passive design impossible. Passive cancellation designs are reported in other publications that utilize DC power generated by the rectifier itself to help overcome the threshold of the devices used. While this approach can provide high efficiencies at low input power levels, it still requires that DC power is generated by the rectifier before any cancellation can take place and therefore fails to address turn-on voltage. See, e.g., S. Guo; H. Lee; "An Efficiency-Enhanced CMOS Rectifier With Unbalanced-Biased Comparators for Transcutaneous-Powered is High-Current Implants," IEEE J. Solid-State Circuits, vol. 44, no. 6, pp. 1796-1804, June 2009; C.-L. Chen, K.-H. Chen, S.-I. Liu, "Efficiency-enhanced CMOS rectifier for wireless telemetry," Electronics Lett., vol. 43, no. 18, pp. 976-978, August 2007; C.-S. A. Gong, K.-W. Yao, J.-Y. Hong, K.-Y. Lin, M.-T. Shiue, "Efficient CMOS rectifier for inductively power-harvested implants," Electron Devices and Solid-State Circuits, 2008, 8-10 Dec. 2008, pp. 1-4; K. Kotani, T. Ito, "High efficiency CMOS rectifier circuit with self-$V_{th}$-cancellation and power regulation functions for UHF RFIDs," Solid-State Circuits Conf., San Francisco, Calif., 12-14 Nov. 2007, pp. 119-122; K. Kotani, A. Sasaki, and T. Ito, "High-Efficiency Differential-Drive CMOS Rectifier for UHF RFIDs," IEEE J. Solid-State Circuits, vol. 44, no. 11, pp. 3011-3018, November 2009; S. Mandal, R. Sarpeshkar, "Low-Power CMOS Rectifier Design for RFID Applications," IEEE Trans. Circuits Syst. I, Reg. Papers, vol. 54, no. 6, T. Umeda, H. Yoshida, S. Sekine, Y. Fujita, T. Suzuki, and S. Otaka, "A 950-MHz rectifier circuit for sensor network tags with 10-m distance," IEEE J. Solid-State Circuits, vol. 41, no. 1, pp. 35-41, January 2006. For the rectifiers in this style of approach, the peak-to-peak voltage of the incoming signal must reach a magnitude greater than Vth for the rectifiers to initially turn on when no DC voltage is present at the rectifier's output.

J. Yi, W.-H. Ki; C.-Y. Tsui, "Analysis and Design Strategy of UHF Micro-Power CMOS Rectifiers for Micro-Sensor and RFID Applications," IEEE Trans. Circuits Syst. 1, Reg. Papers, vol. 54, no. 1, pp. 153-166, January 2007, discloses a charge pump rectifier design that uses advanced process CMOS low or near zero threshold transistors. The charge pump design was reported to achieve a rectifier efficiency of 26.5% at an input power of −11.12 dBm for UHF micro sensor applications. A limitation of the charge pump diode design is that the rectifier's loss over the RF cycle is dependent upon the load.

CMOS coupled designs have advantages over the charge pump diode designs, but artisans have avoided low and near zero threshold transistors because of losses caused by device reverse conduction around zero crossings of the input RF signal. FIG. 1 illustrates a cross-coupled bridge rectifier that uses optimized low threshold transistors from "S. Mandal, R. Sarpeshkar, "Low-Power CMOS Rectifier Design for RFID Applications," IEEE Trans. Circuits Syst. I, Reg. Papers, vol. 54, no. 6, As the output voltage increases, a DC offset voltage builds up at the devices gates (between VinRF and ground or VoutDC), this causes the devices to remain on during zero crossings in the RF input cycle leading to reverse conduction and power loss. The threshold voltage of the devices used is set to an optimal value where reverse conduction is minimized and switch on resistance is minimized at the target output voltage. This leads to peak efficiency at a single target output value.

SUMMARY OF THE INVENTION

Embodiments of the present invention provide cross-coupled rectifiers that use near zero-threshold transistors in a switching topology, but provide a topology that avoids reverse conduction problems. Importantly, preferred embodiment rectifiers of the invention only provide a slightly increased on-resistance in each branch, while providing both very high operating efficiency and very low turn-on voltage. An embodiment of the invention is a voltage rectifier for the conversion of RF energy into DC voltage with a turn-on threshold voltages approaching 0V.

DETAILED DESCRIPTION OF THE PREFERRED EMBODIMENTS

Figure 1:
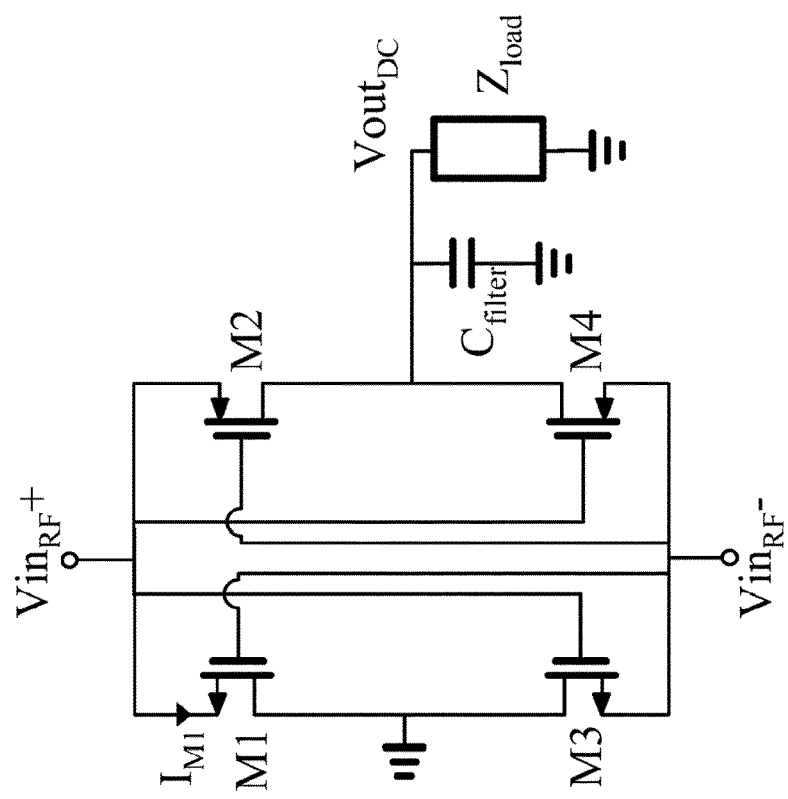
FIG. 1 (prior art) shows a cross-coupled rectifier design that uses low threshold transistors.

Embodiments of the present invention provide cross-coupled rectifiers that use near zero-threshold transistors, but provide a topology that avoids the reverse conduction problem that would arise if such transistors would be used in the topology of FIG. 1. Importantly, preferred embodiment rectifiers of the invention only provide a slightly increased on-resistance in each branch, while providing both very high operating efficiency and very low turn-on voltage. An embodiment of the invention is a voltage rectifier for the conversion of RF energy into DC voltage with a turn-on threshold voltages approaching 0V. State of the art devices require some minimum voltage application to activate the devices, typically a few hundred millivolts, rendering them insensitive to very small input values. Preferred embodiment voltage rectifiers provide response to very low power RF signals, and have many applications. An example application is a sensing device to monitor very small input values and act upon them, well below the current voltage threshold required by conventional devices.

In general, voltage rectifiers of the invention have application in a device or circuit that responds to RF power, and additional specific applications include very low cost RFID devices and/or increased RFID sensing ranges, bio-medical implants, and devices that can scavenge ambient RF radiation, converting it into DC power to be used as a power source for a portable device such as a wireless (battery based) device.

Preferred embodiment rectifiers of the invention use silicon on insulator near zero-threshold transistors. Alternative near zero-threshold transistors that can be used in the invention include near zero-threshold triple well CMOS transistors and programmable threshold devices.

Unlike the FIG. 1 rectifier, embodiments of the invention provide both near zero turn-on voltage with high efficiency. The FIG. 1 design relics on thresholds that raise turn-on voltage to preserve efficiency after turn-on, a compromise which is avoided by rectifiers of the invention.

The CMOS gate cross-connected bridge rectifier stage of FIG. 1 uses low threshold (typically ~|0.4V|) CMOS devices to maintain efficiency at the expense of higher turn on voltage. In FIG. 1, as $Vin_{RF+}-Vin_{RF-}$ increases beyond the device threshold, M3 and M2 will switch on allowing current to flow into the load while M1 and M4 will remain off. Continuing through the cycle as $Vin_{RF+}-Vin_{RF-}$ drops below the device threshold M3 and M2 will turn off and no current will flow to the output until $Vin_{RF+}-Vin_{RF-}$ becomes more negative then $-V_{th}$, at which point M1 and M4 turn on rectifying the negative half of the incoming RF signal. If the amplitude of $Vin_{RF}$ never achieves a value greater then $V_{th}$, Vout DC will be 0V. As a DC voltage develops across the load, the entire structure begins to float, creating a DC offset in the $Vin_{RF}$ waveforms. If the gate to drain voltage exceeds $V_{th}$, a channel is formed and current flows to ground, because CMOS devices are symmetric the drain and source have essentially flipped. The low threshold devices are chosen to limit leakage to a small portion of the RF cycle, because leakage can harm efficiency.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 2A:
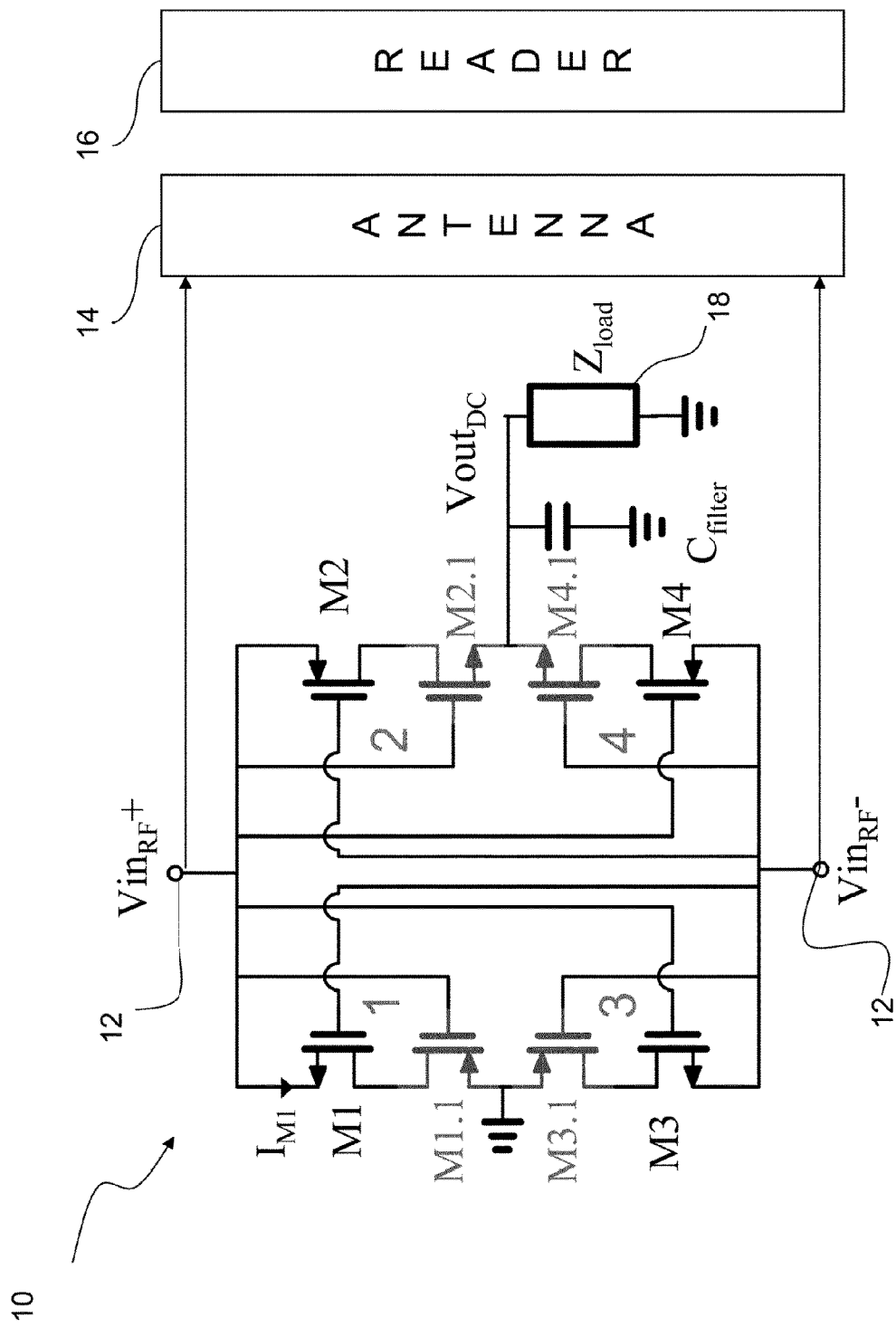
FIGS. 2A and 2B show a preferred embodiment rectifiers of the invention that uses near zero-threshold transistors and blocking transistors.

An embodiment of the invention is a CMOS gate cross-connected bridge rectifier 10 that is shown in FIG. 2A. The rectifier 10, rectifies very low input voltages using near zero-threshold transistors $M_1$-$M_4$ in a cross-coupled switching arrangement along with near zero-threshold blocking transistors $M_{1.1}$-$M_{4.1}$. The CMOS rectifier 10 of FIG. 2A has a near zero turn on voltage and also efficiently converts very low power RF signals to DC energy. The rectifier 10 is in a typical application, such as in an RFID connected, connected with terminals 12 $Vin_{RF+}-Vin_{RF-}$ directly to an antenna 14 to receive input RF energy such as from a reader 16. Artisans will appreciate that the reader 16 is frequently distant from the antenna 14 and can be isolated from the antenna 14 of the RFID devices by attenuating materials. A load 18 of the RFID device can be, for example, sensors and circuitry. In other applications, the load 18 can be biomedical implants and the reader 16 can both communicate with the load 18 and provide instructions for operations of the load. Many other applications will be apparent to artisans, and the rectifier 10 has general applicability in the field of RF powered devices.

Preferred embodiment rectifiers 10 in accordance with FIG. 2A use near zero-threshold/native PMOS and NMOS devices to rectify input voltages which approach 0 V. The near zero threshold transistors $M_1$-$M_4$ are operated in a switching mode rather than a conventional diode connected configuration to minimize the input voltage necessary to develop a given output voltage. The blocking transistors $M_{1.1}$-$M_{4.1}$ significantly suppresses shoot through current loss that would otherwise be significant, but the near zero blocking transistors do not add significant threshold $M_{1.1}$-$M_{4.1}$ and therefore keep turn on voltage near zero. The rectifier 10 thus provides near zero turn-on voltage of native CMOS devices, the fast turn-on (output vs. input voltage) inherent to switching mode rectifiers and suffers very little from the shoot through leakage often associated with switch mode rectifiers.

Since the rectifier 10 uses near zero-threshold devices the turn on input voltage at which RF input signals can be converted to useful DC energy to drive the load 18 is very small. The rectifier 10 has an architecture not limited by the need to first turn-on to achieve a near zero-threshold state like semi-active threshold canceling rectifier designs. Suppression of leakage current while retaining the low turn-on levels of the near zero-threshold design is achieved with the near zero-threshold blocking transistors $M_{1.1}$-$M_{4.1}$. The cross coupled switch includes PMOS near zero-threshold switching transistors $M_1$, $M_3$, and PMOS near zero-threshold blocking transistors $M_{2.1}$ and $M_{4.1}$, as well as NMOS zero-threshold switching transistors $M_2$, $M_4$, and PMOS near zero-threshold blocking transistors $M_{1.1}$ and $M_{3.1}$.

During operation after turn-on, branches 2 and 3 (through devices $M_2$ and $M_{2.1}$, and $M_3$ and $M_{3.1}$ respectively) will be on simultaneously for a portion of the RF cycle while branches 1 and 4 are turned off. Next, the roles will be reversed, 1 and 4 will be on while 2 and 3 will be off. Focusing on the portion of time when 1 and 4 should be on, $Vin_{RF-}$-$Vin_{RF+}$ must be greater than $Vin_{RF+}$-$Vout_{DC}$ for energy to flow into the load 18. If on the other hand, M1 and M4 turn on while $Vin_{RF-}$-$Vin_{RF+}$<$Vout_{DC}$ energy will instead leak from the higher potential load to the lower potential RF inputs and eventually to ground. Referring back to FIG. 1 the DC potential at $Vin_{RF-}$ and $Vin_{RF+}$ is ~(½)$Vout_{DC}$ as the output drops equally across the devices between the output and the RF inputs ($M_2$, $M_4$) and the devices between the RF inputs and ground ($M_1$, $M_3$). Thus $Vin_{RF-}$-$Vin_{RF+}$ can only be greater than $Vout_{DC}$ if $Vin_{RF+}$<0V and $Vin_{RF-}$>V $out_{DC}$ under all other conditions branches 1 and 4 should be completely switched off. Similarly, it can be shown that branches 2 and 3 should only conduct when $Vin_{RF-}$<0V and $Vin_{RF+}$>V $out_{DC}$.

Reverse current blocking operation can be understood by considering branch 1 and the function of at $M_{1.1}$ when $Vin_{RF+}$-$Vin_{RF-}$=0 and $Vin_{RF+}$, $Vin_{RF-}$>0. The gate to source voltage $V_{GS}$ of $M_{1.1}$ will be >0, thereby turning off $M_{1.1}$, which stops any current flow through $M_1$ to ground. As the overall DC offset level rises $M_{1.1}$ will turn off harder further decreasing leakage current. Thus, as DC offset rises so does the blocking effect of $M_{1.1}$, which is opposite to the case of the FIG. 1 topology, where $M_1$ will turn on more strongly as DC offset rises thereby increasing leakage current. Looking to branch 4, $M_{4.1}$ will only conduct when $Vin_{RF-}$>V $out_{DC}$, this ensures no reverse conduction through branch 4 is possible. Branches 2 and 3 perform in an analogous manner. Suppression of reverse current is excellent with low turn on voltage. A penalty of elevated on resistance occurs because there are two devices in series in each conduction path. Specifically, on resistance is increased because the sources of $M_{1.1}$ and $M_{3.1}$ ($M_{2.1}$ and $M_{4.1}$) (through the load) are connected to ground when their respective current paths are active. Thus, with reference to $M_{1.1}$ $V_{GS}$=$Vin_{RF+}$ which is smaller than $V_{GS}$ of $M_1$ in FIG. 1, which is $Vin_{RF-}$-$Vin_{RF+}$. Since the current through the devices is proportional to $V_{GS}$, the branches in the rectifier 10 of FIG. 2A will turn on less strongly for a given input amplitude than the FIG. 1 design. The near zero threshold devices helps keep on resistance down, but the FIG. 2A device provides an overall performance improvement even with an increase in on-resistance compared to the FIG. 1 device.

Figures 2B, 2C:
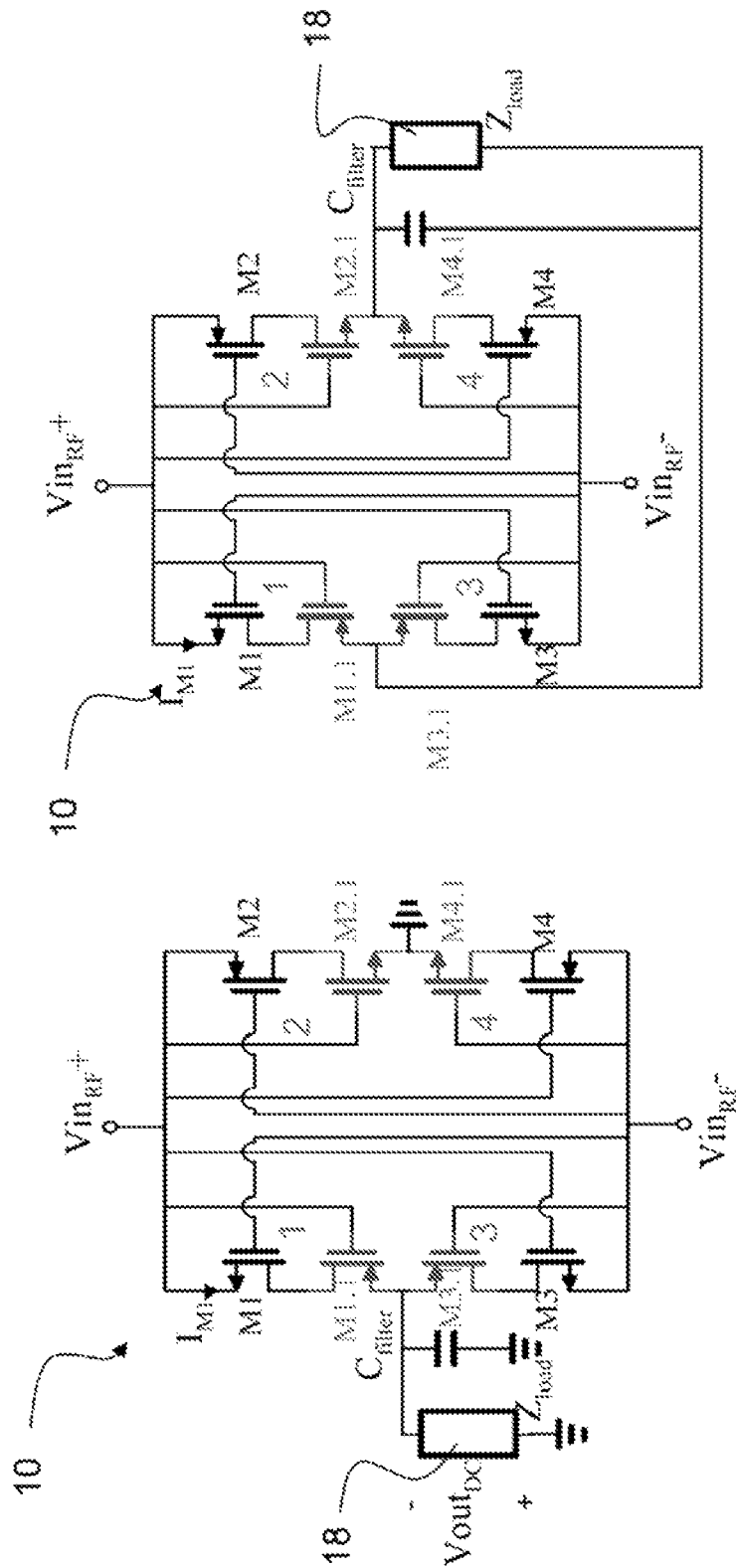
FIG. 2C illustrates that ground may not be true ground, but can float.

Artisans will appreciate that if all of the NMOS transistors are switched for PMOS and vice versa in FIG. 2A, the rectifier will work the same way, except the polarity of the output will be reversed. This embodiment is shown in FIG. 2B, with like elements being labeled as they are in FIG. 2A. Also, in many applications, there will not be a true ground, and ground can float as represented in FIG. 2C. Thus, "ground" as used herein also encompasses the floating ground represented in FIG. 2C.

Figure 3:
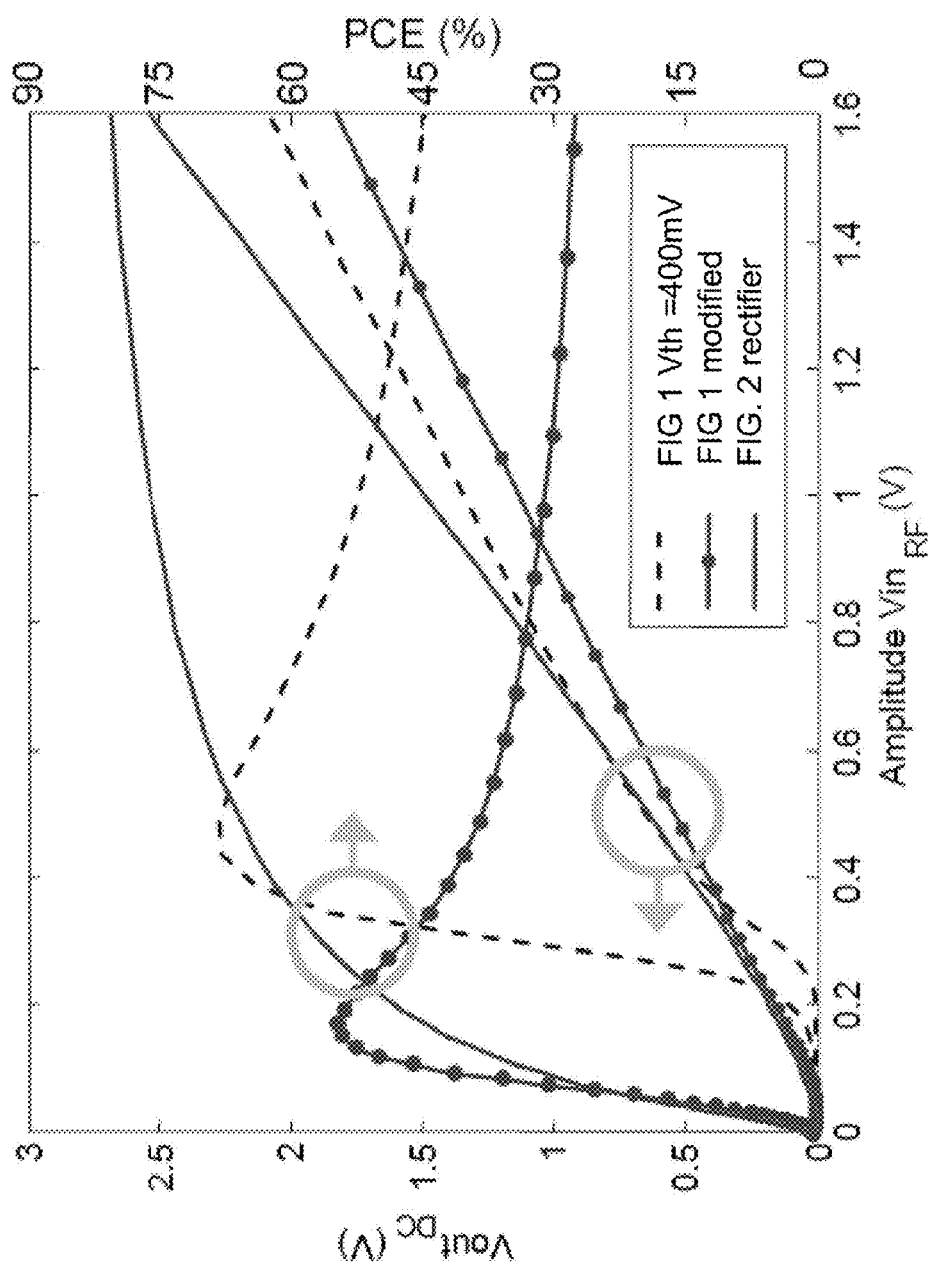
FIG. 3 shows simulated DC output voltage and power conversion efficiency versus RF input amplitude for single stage rectifiers according to FIG. 2A, FIG. 1, and a modified version of FIG. 1 (having near zero threshold transistors) at 100 MHz into a 30 k$\Omega$ load.
Figure 4:
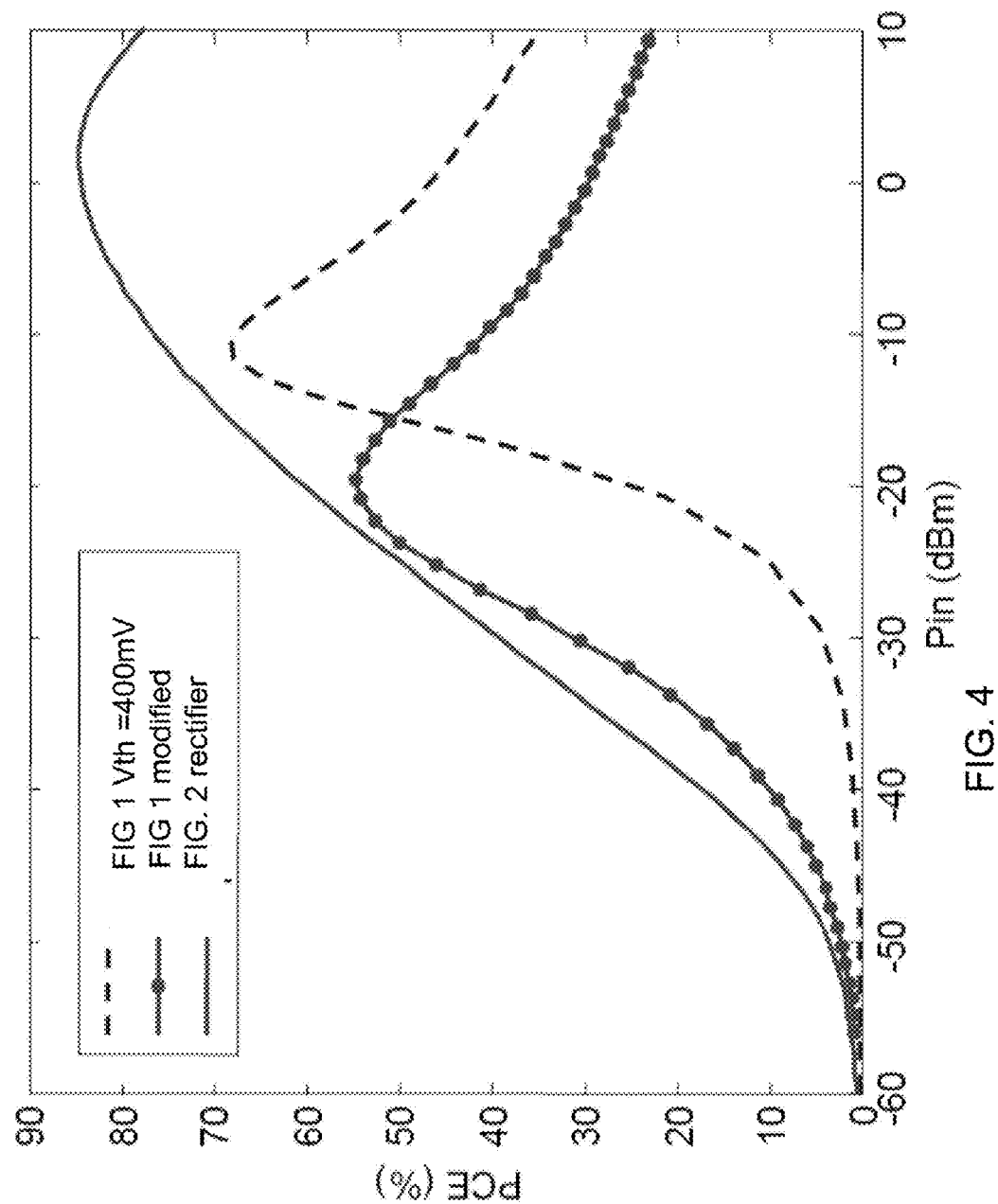
FIG. 4 shows simulated power conversion efficiency versus RF input amplitude for single stage rectifiers according to FIG. 2A, FIG. 1, and a modified version of FIG. 1 (having near zero threshold transistors)
Figure 5:
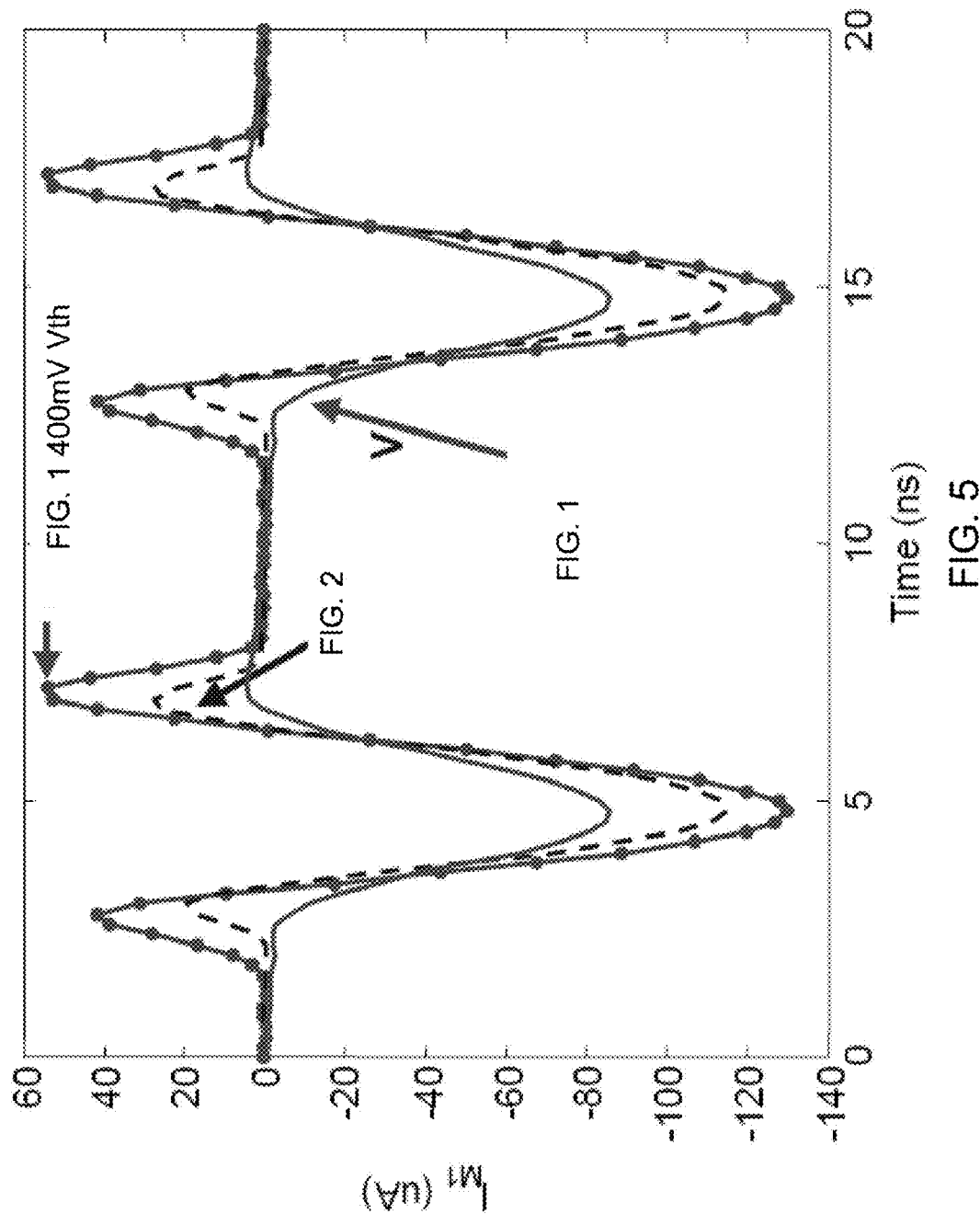
FIG. 5 shows simulated time domain waveforms for the current through transistor M1 for single stage rectifiers according to FIG. 2A, FIG. 1, and a modified version of FIG. 1 (having near zero threshold transistors) at 100 MHz into a 30 k$\Omega$ load.

Simulations were conducted and demonstrated the performance benefits of the rectifier 10 of FIG. 2A. FIG. 3 shows simulated DC output voltage and power conversion efficiency versus RF input amplitude for single stage rectifiers at 100 MHz into a 30 kΩ load. For the classic design (FIG. 1) and a modified version of the FIG. 1 design that uses near zero-threshold transistors, efficiency peaks take place when $Vout_{DC}$ is approximately equal to $V_{th}$ of the devices used and very little leakage occurs. The benefits of the new design are evident from the simulations, which show that enhanced performance at low input levels provided by the intrinsic devices is retained while the loss at higher input due to reverse leakage is reduced. The effect of the additional on resistance from transistors $M_{1.1}$-$M_{4.1}$ has only a very minor effect on the performance. At an input RF amplitude of ~0.55V, the output voltage of the classic design with standard devices exceeds the output voltage of the efficiency enhanced design. FIG. 3 shows that the power conversion efficiency (PCE) of the FIG. 1 rectifier and its modified version (with near zero-threshold transistors) exceeds that of the FIG. 2A designs at their peak values, but the PCE of the FIG. 2A design continues to increase as RF input voltage increases while the FIG. 1 rectifier and its modified version drops substantially after peaking. Peaks for the FIG. 1 and modified FIG. 1 rectifiers occur at levels where the trade off between output voltage (power) and reverse leakage current is optimal. At these input levels, there is very little reverse leakage and thus the loss due to on resistance is the dominant factor impacting PCE. However, DC offset and reverse current flow then take over and impede efficiency for the FIG. 1 and modified FIG. 1 rectifier. It is also interesting that the FIG. 1 and modified FIG. 1 rectifier are consuming more input power (lower input impedance) at these input voltages than the FIG. 2A design. Specifically, far the input voltages (~100 mV and ~400 mV) in FIG. 3, the PCE of the FIG. 1 and modified FIG. 1 rectifier peak above the PCE of the FIG. 2A rectifier. Those corresponding peaks in FIG. 4 chart do not reach above the PCE of the FIG. 2A rectifier at their respective input powers (~-22 dBm and -11 dBm). This means that the input impedance of the FIG. 1 rectifier and modified FIG. 1 rectifier is lower than that of the FIG. 2 design so a given input voltage occurs at a larger input power. This results in FIG. 2A rectifier having superior efficiency across all input power levels as depicted in FIG. 4. The difference in leakage can be observed by plotting the current through $M_1$ ($I_{M1}$) versus time for the three cases, as shown in FIG. 5, which shows simulated time domain waveforms of the current through transistor M1 for single stage rectifiers. The 100 MHz input power was adjusted to achieve equal output voltage (1V) across a 30 kΩ load. The FIG. 2A rectifier exhibits very low leakage (current into ground or positive current given the polarity of $I_{M1}$ in FIG. 1 and FIG. 2A) and thus the rectifier is able to provide the same output power with lower on current. The input power was set in the simulation to insure that the output voltage would be ~1V for each case. Since the load resistance is the same for each case, the power delivered by each design is equivalent. The simulation shows that the FIG. 2A rectifier greatly reduces reverse conduction leakage (positive current) compared to the FIG. 1 design with low threshold transistors or the modified FIG. 1 design having near zero transistors.

Figure 6:
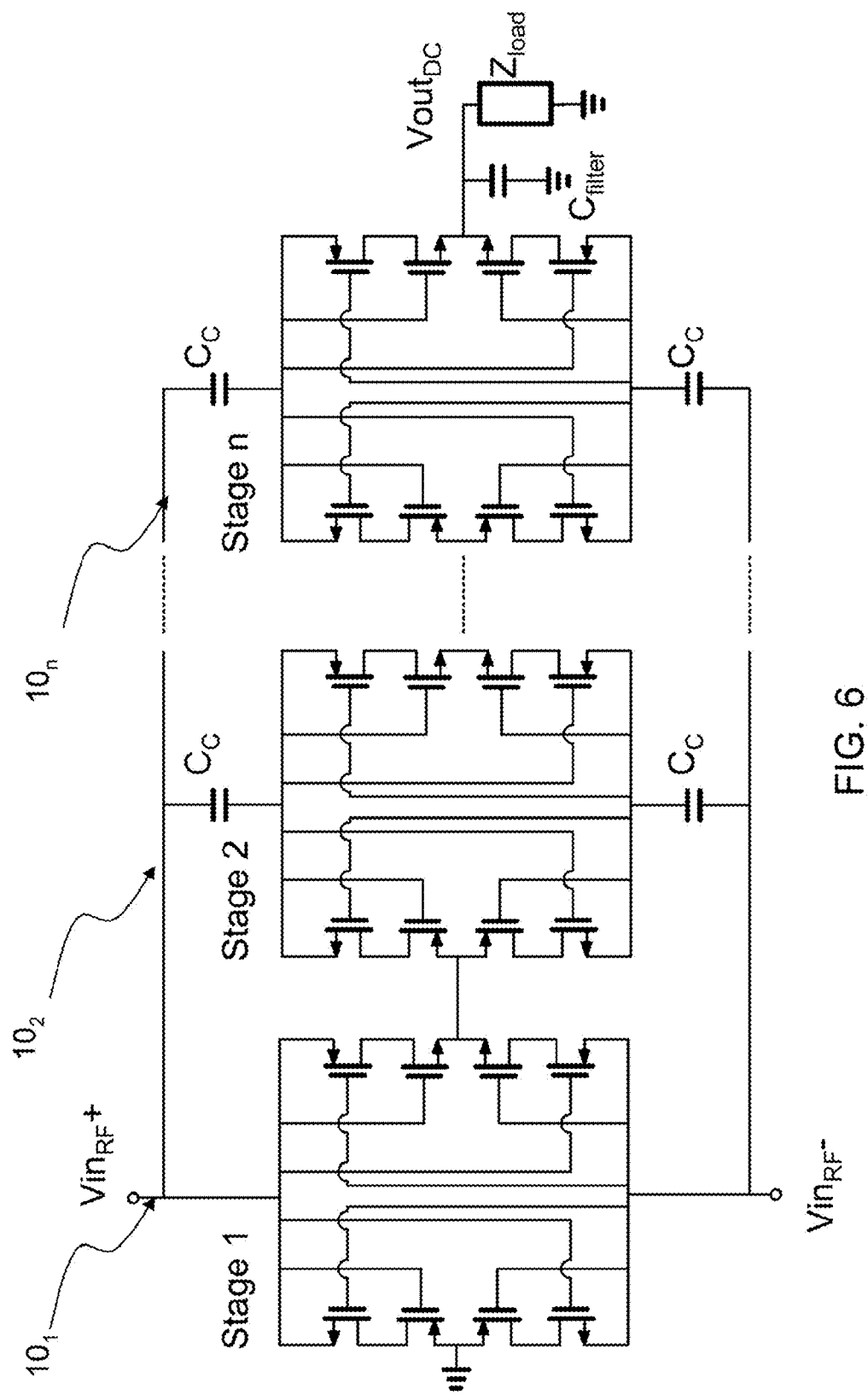
FIG. 6 shows a preferred embodiment multi-stage rectifier of the invention that includes multiple stages in accordance with FIG. 2A.

FIG. 6 shows a multi-stage rectifier design of the invention that includes a series of n rectifiers $10_1$-$10_n$ that are constructed in accordance with FIG. 2A. The multiple rectifiers $10_1$-$10_n$ can be used to raise the voltage at the load because later stages float on the DC voltage produced by the earlier stage. The multi-stage rectifier design of FIG. 6 incurs an efficiency penalty compared to the single stage design of FIG. 2A. However, the FIG. 6 design would have significantly higher efficiency than a cascade of the FIG. 1 rectifiers. The improved efficiency is particularly important in microwave frequency applications, for example. High frequency signals have shorter wavelengths and thus efficient antenna designs can be physically smaller, which is essential when attempting to scale down the size of a biomedical implant. On the other hand, signal attenuation in biological tissue increases with frequency and the rectifier efficiency and choice of RF wavelength are therefore important.

For the multi-stage rectifier, input impedance can be important to match an antenna to the rectifier. Optimal impedance is dependent on antenna design. The capacitive component of the rectifier input impedance can be absorbed into the capacitor which is used to resonate with the coil antenna. Thus for matching, the imaginary part of Yin can be ignored and only the real part is of importance. For an ideal coil/capacitor combination the real part of Yin is zero, but for realistic micro coils a value on the order of 0.1 mS in the 100 MHz frequency range is typical. This indicates that the parallel input resistance (1/real(Yin)) of the rectifier be on the order of 10 kΩ for maximum power transfer. Coupling capacitors of stages 2-n should be selected to be sufficiently larger than the parasitic capacitance of the transistors to ensure that the RF swing at the input of each stage is not significantly reduced from $Vin_{RF}$. The constraint on making the capacitors too large is that MIM capacitors eat up chip space. Simulations showed that a value of ~150 fF was optimum for efficiency. The size of the transistors used affects the optimum value of capacitance for efficiency. The coupling capacitors should have a capacitance that is larger than the parasitic capacitance of the transistors in the rectifier.

In a particular design, the number of stages and transistor width affect maximum power conversion efficiency at a predetermined desired power output and input resistance. As the number of stages increases, the amount of loss for a given input power will increase because the number of switching transistors has increased. On the other hand, the ratio $Vout_{DC}$ to $Vin_{RF}$ will increase because of the charge pumping through the stages. Meanwhile, $Z_{in}$, will decrease because of the higher loss and the additional parallel paths connected to the input. With respect to device size, larger devices have more parasitic capacitance which contributes to switching losses. On the other hand larger W/L devices will have smaller on resistance which will improve efficiency. In the experiments and simulations, PMOS and NMOS devices were sized for equal on resistance $W_P$=2$W_N$ and each stage was sized uniformly. Generally, PCE decreases with the number of stages, but device width increases have an effect that is dependent upon the number of stages.

Figure 7:
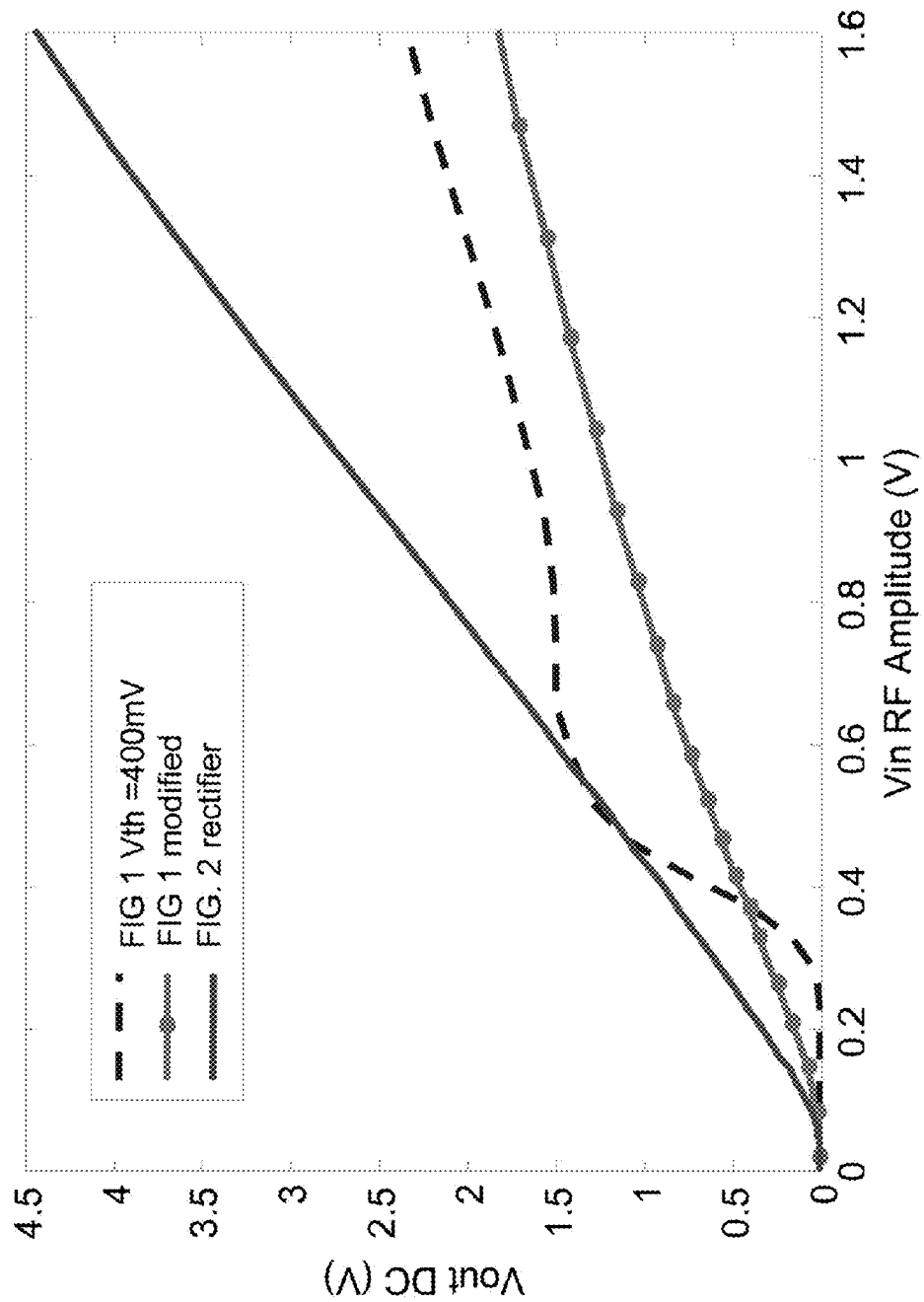
FIG. 7 shows measured DC output voltage versus RF input voltage from the fabricated three-stage rectifiers at 100 MHz for stage rectifiers according to FIG. 2A, FIG. 1, and a modified version of FIG. 1 (having near zero threshold transistors)

A three stage rectifier structure according to FIGS. 2 and 6 has been fabricated and tested. The experimental structure of FIG. 6 was fabricated in Peregrine's silicon on sapphire (SOS) 0.25 um CMOS process in an active area of 88 μm×.74 μm. The particular process used to form the near zero-threshold transistors will determine the value of the near zero-threshold of the devices. In the experimental structure, the native/near-zero threshold devices had a threshold of about 50 mV. In addition, a multi-stage structure for the FIG. 1 rectifier and a FIG. 1 modified rectifier (having near zero-threshold transistors) were also fabricated and tested in different areas of the same die. FIG. 7 shows the measured DC output voltage versus RF input voltage from the fabricated three-stage rectifiers at 100 MHz. The experimentally measured data highlights the fact that the rectifier of FIG. 2A is clearly superior across all input and output voltages and provides a particular advantage at lower output voltages. In general, the FIG. 6 rectifier provides the best performance across all input levels including the target 1V output. The design based upon FIG. 1 with low threshold devices achieves a slightly higher $Vout_{DC}$ at $Vin_{RF}$ 0.5V than the FIG. 2A & 6 rectifier. At this point, the FIG. 1 exhibits very little leakage and the lower on resistance of the branches slightly improves performance, but performance of the FIGS. 2A and 6 rectifier is better at the target 1V output and there is also a much lower turn-on voltage.

The FIG. 1 rectifier with $V_{th}$=400 mV achieves the target $Vout_{DC}$=1V at Vin=0.45V. The modified rectifier achieves the target 1V it at 0.79V, and the FIG. 2A rectifier achieves it at 0.42V. More impressive is the great improvement in PCE as shown in FIGS. 3 and 4. For PCE at the target 1V output, the FIG. 1 with Vth=400 mV achieves a simulated PCE of 59.6%, the FIG. 1 modified rectifier achieves a simulated PCE of 31.76% and the FIG. 2A/6 rectifier achieves simulated PCT of 71.5%.

The chip was tested on a microprobe station. The differential input signal was supplied by a 4-port vector network analyzer, which has the ability to send true differential signals while simultaneously measuring balanced S-parameters. This permitted measurement of the differential input impedance of the rectifier across power and frequency. The differential input impedance of the rectifier varies with frequency and to a lesser extent input power. To ensure that the input voltage could be accurately measured, a 100Ω resistor was included on chip across the differential input. The output was measured using a multimeter across a 1 MΩ load used to simulate a μW biomedical implant chip (1 μW at 1V). The load resistor was approximately 1.1 MΩ such that the combined impedance of the multimeter (input impedance 10 MΩ) and the load resistor was 1 MΩ. Measured results match quite well with simulations. A discrepancy at low input powers is due to the fact that the output voltage and the differential S-parameters were hard to accurately measure at such low levels given the limitations of the test equipment used. At higher input powers the simulation slightly over-predicts the PCE, which can be attributed to deficiencies in the compact models used. From simulations, peak PCE is expected to occur for the FIG. 2A rectifier when the devices are operating very close to breakdown.

Figure 8:
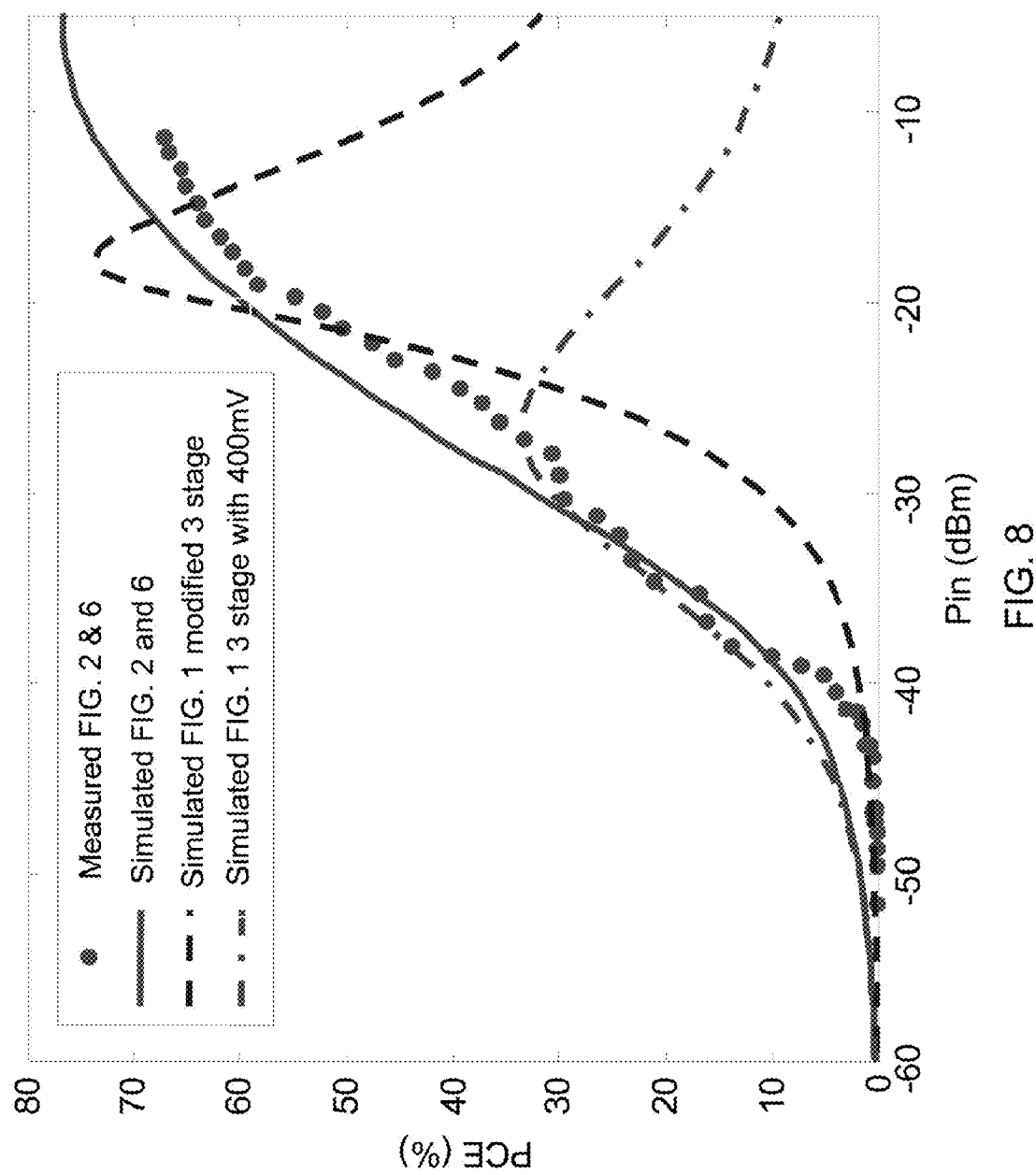
FIG. 8 shows measured and simulated power conversion efficiencies for three-stage rectifiers according to FIG. 2A, FIG. 1, and a modified version of FIG. 1 (having near zero threshold transistors).

FIG. 8 shows power conversion efficiencies (some of the data is simulated as circuits were not fabricated for the FIG. 1 and modified FIG. 1 circuits without the shunt 100Ω input resistor). Generally, the FIGS. 2A and 6 rectifier provide high efficiency over a wide power range, while the rectifies of FIG. 1 and a modified version with the near zero-threshold transistors is efficient in a very limited input power range. In real world applications, input power range can vary significantly, so the FIG. 2A and FIG. 6 rectifier provides superior performance. The FIG. 2A and FIG. 6 design also maintained a ~1V output at input frequencies as high as 10 GHZ, though PCE starts to suffer after 1 GHZ due to switching losses that occur at higher frequencies.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A very lower power RF voltage rectifier, comprising:
   differential positive and negative inputs;
   a load; and
   a switching mode CMOS gate cross-connected bridge connecting said differential input to said load, said CMOS gate cross-connected bridge comprising,
      a first series path from the positive input through a first near zero threshold PMOS switching transistor and first near zero-threshold NMOS blocking transistor to one of ground or a load;
      a second series path from the negative input through a first near zero-threshold NMOS switching transistor and second near zero-threshold PMOS blocking transistor to the other of said load and said ground;
      a third series path from between the negative input through a third near zero-threshold PMOS switching transistor and a third near zero-threshold NMOS blocking transistor to said one of ground or a load; and
      a fourth series path from the positive input through a fourth near zero-threshold NMOS switching transistor and fourth near zero-threshold PMOS blocking transistor to the other of said load and said ground.

2. The rectifier of claim 1, wherein said differential positive and negative inputs are connected to an RF antenna.

3. The rectifier of claim 2, wherein said load comprises a DC biomedical device.

4. The rectifier of claim 2, wherein said load comprises a DC RFID circuit.

5. A multi-stage rectifier comprises a series of rectifiers of claim 1 capacitively coupled between said inputs and said load.

6. The rectifier of claim 1, wherein said switching and blocking transistors comprise silicon on insulator near zero-threshold transistors.

7. The rectifier of claim 6, wherein said switching and blocking transistors comprise silicon on sapphire near zero-threshold transistors.

8. The rectifier of claim 1, wherein said switching and blocking transistors comprise triple well near zero-threshold transistors.

9. The rectifier of claim 1, wherein said switching and blocking transistors comprise programmable threshold near zero-threshold transistors.

10. The rectifier of claim 1, wherein the widths of NMOS and PMOS transistors in said CMOS cross-connected bride is set for equal on-resistance.

11. A very lower power RF voltage rectifier, comprising:
    a CMOS gate cross-connected switching mode bridge having near zero-threshold devices to convert RF signals to DC energy; and
    blocking transistor means for blocking shoot through current losses.

12. A very lower power RF voltage rectifier, comprising:
    a differential input connected to a gate of a first near zero-threshold PMOS switching transistor, a gate of a second near zero-threshold NMOS switching transistor, a gate of a third near-zero threshold NMOS blocking transistor, a source of a third near-zero threshold PMOS switching transistor, a gate of a fourth near zero-threshold PMOS blocking transistor, and a source of a fourth near zero-threshold NMOS switching transistor;
    an opposite differential input connect to a source of said first near zero-threshold PMOS switching transistor, a gate of a first near-zero threshold NMOS blocking transistor, a source of said second near zero-threshold NMOS switching transistor, a gate of a second near-zero threshold PMOS blocking transistor, a gate of said third near zero-threshold PMOS switching transistor, and a gate of said fourth near zero-threshold NMOS switching transistor;
    sources of said first and third blocking transistors being connected to each other or to each other and a load;
    sources of said second and further blocking transistors being connected to each other or to each other and a load; and
    drains of respective ones of said first through fourth switching transistors being connect to drains of said first through further blocking transistors.

13. The rectifier of claim 12, wherein said switching and blocking transistors comprise silicon on insulator near zero-threshold transistors.

14. The rectifier of claim 13, wherein said switching and blocking transistors comprise silicon on sapphire near zero-threshold transistors.

15. The rectifier of claim 12, wherein said switching and blocking transistors comprise triple well near zero-threshold transistors.

16. The rectifier of claim 12, wherein said switching and blocking transistors comprise programmable threshold near zero-threshold transistors.

* * * * *

UNITED STATES PATENT AND TRADEMARK OFFICE
CERTIFICATE OF CORRECTION

PATENT NO. : 8,415,837 B2  
APPLICATION NO. : 12/949343  
DATED : April 9, 2013  
INVENTOR(S) : Paul Theilmann et al.

Page 1 of 1

It is certified that error appears in the above-identified patent and that said Letters Patent is hereby corrected as shown below:

In the Specification:

Col. 6, line 56    After "Specifically," please delete "far" and insert --for-- therefor.

In the Claims:

Col. 10, line 41, Claim 12    After "being" please delete "connect" and insert --connected-- therefor.

Signed and Sealed this  
Twenty-fourth Day of December, 2013

Margaret A. Focarino  
*Commissioner for Patents of the United States Patent and Trademark Office*